US011051377B1

United States Patent
Xiong

(10) Patent No.: US 11,051,377 B1
(45) Date of Patent: Jun. 29, 2021

(54) DYNAMIC OVERLOAD PROTECTION METHOD

(71) Applicant: Universal Lighting Technologies, Inc., Madison, AL (US)

(72) Inventor: Wei Xiong, Madison, AL (US)

(73) Assignee: Universal Lighting Technologies, Inc., Madison, AL (US)

( * ) Notice: Subject to any disclaimer, the term of this patent is extended or adjusted under 35 U.S.C. 154(b) by 0 days.

(21) Appl. No.: 16/871,653

(22) Filed: May 11, 2020

Related U.S. Application Data

(60) Provisional application No. 62/911,681, filed on Oct. 7, 2019.

(51) Int. Cl.
  *H05B 45/30* (2020.01)
  *H05B 45/305* (2020.01)
  *H05B 45/34* (2020.01)

(52) U.S. Cl.
  CPC ........... *H05B 45/305* (2020.01); *H05B 45/34* (2020.01)

(58) Field of Classification Search
  CPC ........ H05B 45/37; H05B 45/39; H05B 45/50; H05B 45/382; H02M 1/4233; H02M 1/4241; H02M 3/335; H02M 3/3376
  See application file for complete search history.

(56) References Cited

U.S. PATENT DOCUMENTS

| | | |
|---|---|---|
| 9,837,913 B1 | 12/2017 | Xiong |
| 10,098,194 B1 | 10/2018 | Xiong |
| 2012/0194078 A1* | 8/2012 | Ren ...................... H05B 45/325 315/122 |
| 2015/0103562 A1 | 4/2015 | Yeh et al. |
| 2015/0130372 A1* | 5/2015 | Chitta ..................... H02M 1/08 315/307 |
| 2015/0245431 A1* | 8/2015 | Rutgers .................. H05B 45/37 315/210 |
| 2017/0093296 A1 | 3/2017 | Chen |

(Continued)

OTHER PUBLICATIONS

International Rectifier for IRS27951S and IRS27952(4)(S), Aug. 27, 2015, p. 1-29 (2015).

*Primary Examiner* — Tung X Le
(74) *Attorney, Agent, or Firm* — Patterson Intellectual Property Law, P.C.; Gary L. Montle; Alex H. Huffstutter

(57) ABSTRACT

Circuitry and methods are provided for dynamically controlling the operating frequency of a resonant power converter. A feedback circuit generates error signals representing a difference between sensed output voltages and a constant target output voltage. A controller comprises a frequency control input terminal, and generates drive signals to half-bridge switching elements at determined operating frequencies. A frequency control circuit is coupled between the feedback circuit and the frequency control input terminal. The frequency control circuit sets minimum and maximum operating frequencies for the controller, and dynamically adjusts the operating frequency with respect to the constant target output voltage. A frequency control power supply circuit may further provide signals to the frequency control circuit representative of voltage across the resonant capacitor, wherein the minimum operating frequency is dependent thereon. The minimum frequency may be reduced with decreasing of the output voltage, and a maximum current may be reduced with increased overloading.

18 Claims, 6 Drawing Sheets

(56) References Cited

U.S. PATENT DOCUMENTS

| | | |
|---|---|---|
| 2017/0187298 A1 | 6/2017 | Lin |
| 2017/0222565 A1 | 8/2017 | Sonobe |
| 2018/0262118 A1 | 9/2018 | Ouyang |
| 2019/0044434 A1* | 2/2019 | Elferich ................. H05B 45/37 |

* cited by examiner

DYNAMIC OVERLOAD PROTECTION METHOD

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

CROSS-REFERENCES TO RELATED APPLICATIONS

This application claims benefit under 35 USC. § 119(e) of U.S. Provisional Patent Application No. 62/911,681, filed Oct. 7, 2019, entitled "Dynamic Overload Protection Method."

FIELD OF THE INVENTION

The present disclosure relates generally to power supplies that provide a DC voltage to a load, such as, for example, light-emitting diodes. More particularly, the present disclosure relates to an apparatus and method for dynamically controlling the frequency of a power supply when overloaded.

BACKGROUND

Light emitting diodes (LEDs) provide light in response to receiving a DC current (assuming proper bias) and in proportion to the received DC current. Resistance of an LED light source fluctuates. Therefore, constant current driver circuits are preferred with LED based light sources. Underwriters Laboratories (UL) class II standards for LED driver circuits require certain criteria to pass regulation, including for example that the driver circuit have an isolated output, pass a short circuit test, provide a controlled (i.e., limited) output voltage, and provide a constant current. Of particular importance to the present disclosure is a requirement that at any time the output power cannot be more than 100 watts and the output current cannot be more than 8 amperes. A DC-to-DC power converter is one example of a constant output voltage driver that can be configured to control the power output, for example by controlling the output current and voltage at the same time in order to make sure the output power is less than 100 watts and the output current is less than 8 amperes at any time.

In an illustrative example, a DC-to-DC converter drives a DC load such as, for example, one or more light-emitting diodes (LEDs). The converter includes a DC-to-AC inverter in a primary circuit. The inverter generates a switched AC voltage, which is applied to the primary winding of an isolation transformer. A secondary winding of the isolation transformer provides an input to an AC-to-DC rectifier in a secondary circuit. The rectifier produces a DC voltage, which is applied to the load. The magnitude of a current flowing through the load is sensed and compared to a reference magnitude. Additionally, the magnitude of a voltage across the load is sensed and compared to a reference magnitude. A first operational amplifier or other comparator in the secondary circuit generates a current feedback signal in response to a difference between the sensed current magnitude and the reference magnitude. A second operational amplifier or other comparator in the secondary circuit generates a voltage feedback signal in response to a difference between the sensed voltage magnitude and the reference magnitude. The feedback signals are fed to a current control circuit to regulate a frequency control current flowing from a control terminal of a switch controller integrated circuit in the DC-to-AC inverter. The switch controller is responsive to the frequency control current to vary the frequency of the switched AC voltage. Varying the frequency of the AC voltage varies the magnitude of the load current to control the output power to be, for example, less than 100 watts with an output current of less than 8 amperes.

An issue with controlling the output power by monitoring both the load current and the load voltage is that if the maximum load current is high, for example, greater than 5 amperes, then sensing the current will be very lossy. Accordingly, a special current sensing resistor would have to be used for circuits which produce such a high current. The special current sensing resistor can be very costly.

Additionally, the current feedback signal has to be integrated with voltage feedback signal to generate the frequency control current in the current control circuit, which can be very complicated.

A further issue occurs when the driver operates in an overload (or over current) situation and/or a short circuit situation, particular trying to limit the output current and protect the circuit components.

BRIEF SUMMARY

Accordingly, a need exists for improvements to the DC-to-DC converter to control the maximum output current and maximum power in a different and more efficient way, and which simplify the design and reduce the costs of producing the circuit while also protecting the circuit components.

One embodiment of a resonant power converter as disclosed herein comprises first and second switching elements coupled across a direct current (DC) power source, for example in a half-bridge arrangement. A resonant circuit including a resonant capacitor is coupled between an isolation transformer primary winding and an output node defined between the first and second switching elements. A voltage sensing circuit is coupled to a secondary winding of the isolation transformer and provides a sensor output signal representative of an output voltage across a load. A feedback circuit generates an error signal responsive to a difference between the sensor output signal and a reference signal corresponding to a constant target output voltage. A controller comprises a frequency control input terminal and further generates drive signals to the first and second switching elements at a determined operating frequency. A frequency control circuit is coupled between the feedback circuit and the frequency control input terminal of the controller. The frequency control circuit sets a minimum operating frequency and a maximum operating frequency of the controller, and further dynamically adjusts the operating frequency of the controller with respect to the constant target output voltage.

In one exemplary aspect of a resonant power converter according to the above-referenced embodiment, a frequency control power supply circuit is coupled in parallel with the resonant capacitor, and configured to provide a frequency control power signal representative of a voltage across the resonant capacitor. The frequency control circuit dynamically adjusts the minimum operating frequency of the drive signals of the controller based on the frequency control power signal, at least during an overload situation of the load.

In another exemplary aspect of a resonant power converter according to the above-referenced embodiment, the voltage across the resonant capacitor is directly proportional to the output voltage across the load.

In another exemplary aspect of a resonant power converter according to the above-referenced embodiment, the frequency control circuit is further configured to apply a first resistance between the frequency control input terminal and a primary side ground, thereby defining the minimum operating frequency associated with a maximum output current to the load during a normal operating situation.

For example, the overload situation may be associated with a resistance of the load reducing below a threshold whereby the output voltage cannot be maintained at the reference signal, and the normal operating situation is associated with the resistance of the load being above the threshold.

As another example, the frequency control circuit may be configured to apply a second resistance between the frequency control input terminal and the primary side ground, the combination of the first resistance and the second resistance thereby defining a maximum operating frequency associated with a minimum output current to the load. The controller may further be configured to regulate the operating frequency of the first and second switching elements between the maximum and minimum operating frequencies based at least on the error signal.

In another exemplary aspect of a resonant power converter according to the above-referenced embodiment, the frequency control circuit is configured to force the operating frequency to equal the maximum operating frequency during a short circuit situation of the load.

In another exemplary aspect of a resonant power converter according to the above-referenced embodiment, the frequency control power supply circuit includes at least first and second capacitors coupled in series across the resonant capacitor, wherein the first and second capacitors act as a voltage divider to generate the frequency control power signal.

In another exemplary aspect of a resonant power converter according to the above-referenced embodiment, the frequency control circuit includes an optocoupler having an input stage and an output stage, with the input stage being coupled to receive the error signal, and the output stage having a variable impedance between a first output terminal and a second output terminal responsive to at least one of the error signal or the frequency control power signal. The frequency control power signal may further be coupled to the first output terminal.

The input stage of the optocoupler may be coupled to a secondary circuit ground reference through a switch, wherein the switch can protect the resonant power converter from a short circuit situation by forcing the controller to operate at a maximum operating frequency.

A gate of the switch may further be coupled to the output voltage.

In another exemplary aspect of a resonant power converter according to the above-referenced embodiment, the frequency control circuit may be configured to dynamically increase the minimum operating frequency to decrease the maximum output current during the overload situation.

In another exemplary aspect of a resonant power converter according to the above-referenced embodiment, the frequency control circuit may be configured to increase the minimum operating frequency when the output voltage decreases during the overload situation.

In another embodiment as disclosed herein, a method is provided for controlling an output current of a resonant power converter having a substantially constant output voltage. A voltage signal is sensed across a resonant capacitor of the resonant power converter, the voltage signal being proportional to an output voltage of the resonant power converter. A drop is sensed in the output voltage as being associated with an overload situation. An operating frequency of the resonant power converter is dynamically controlled based at least on the sensed voltage signal across a resonant capacitor, and a minimum operating frequency of the resonant power converter is increased in response to a reduction in the sensed voltage signal across a resonant capacitor.

In an exemplary aspect of a method according to the above-referenced embodiment, an output current of the resonant power converter may be controlled based on the operating frequency.

In another exemplary aspect of a method according to the above-referenced embodiment, a short circuit situation of the resonant power converter is sensed, wherein for example the resonant power converter may be operated at a maximum operating frequency in the short circuit situation.

BRIEF DESCRIPTION OF THE SEVERAL VIEWS OF THE DRAWINGS

Numerous objects, features and advantages of the embodiments set forth herein will be readily apparent to those skilled in the art upon reading of the following disclosure when taken in conjunction with the accompanying drawings.

DETAILED DESCRIPTION

While the making and using of various embodiments of the present invention are discussed in detail below, it should be appreciated that the present invention provides many applicable inventive concepts that can be embodied in a wide variety of specific contexts. The specific embodiments discussed herein are merely illustrative of specific ways to make and use the invention and do not delimit the scope of the invention.

The following detailed description of embodiments of the present disclosure refers to one or more drawings. Each drawing is provided by way of explanation of the present disclosure and is not a limitation. Those skilled in the art will understand that various modifications and variations can be made to the teachings of the present disclosure without departing from the scope of the disclosure. For instance, features illustrated or described as part of one embodiment can be used with another embodiment to yield a still further embodiment.

The present disclosure is intended to cover such modifications and variations as come within the scope of the appended claims and their equivalents. Other objects, features, and aspects of the present disclosure are disclosed in the following detailed description. One of ordinary skill in the art will understand that the present discussion is a description of exemplary embodiments only and is not intended as limiting the broader aspects of the present disclosure.

Figure 1:
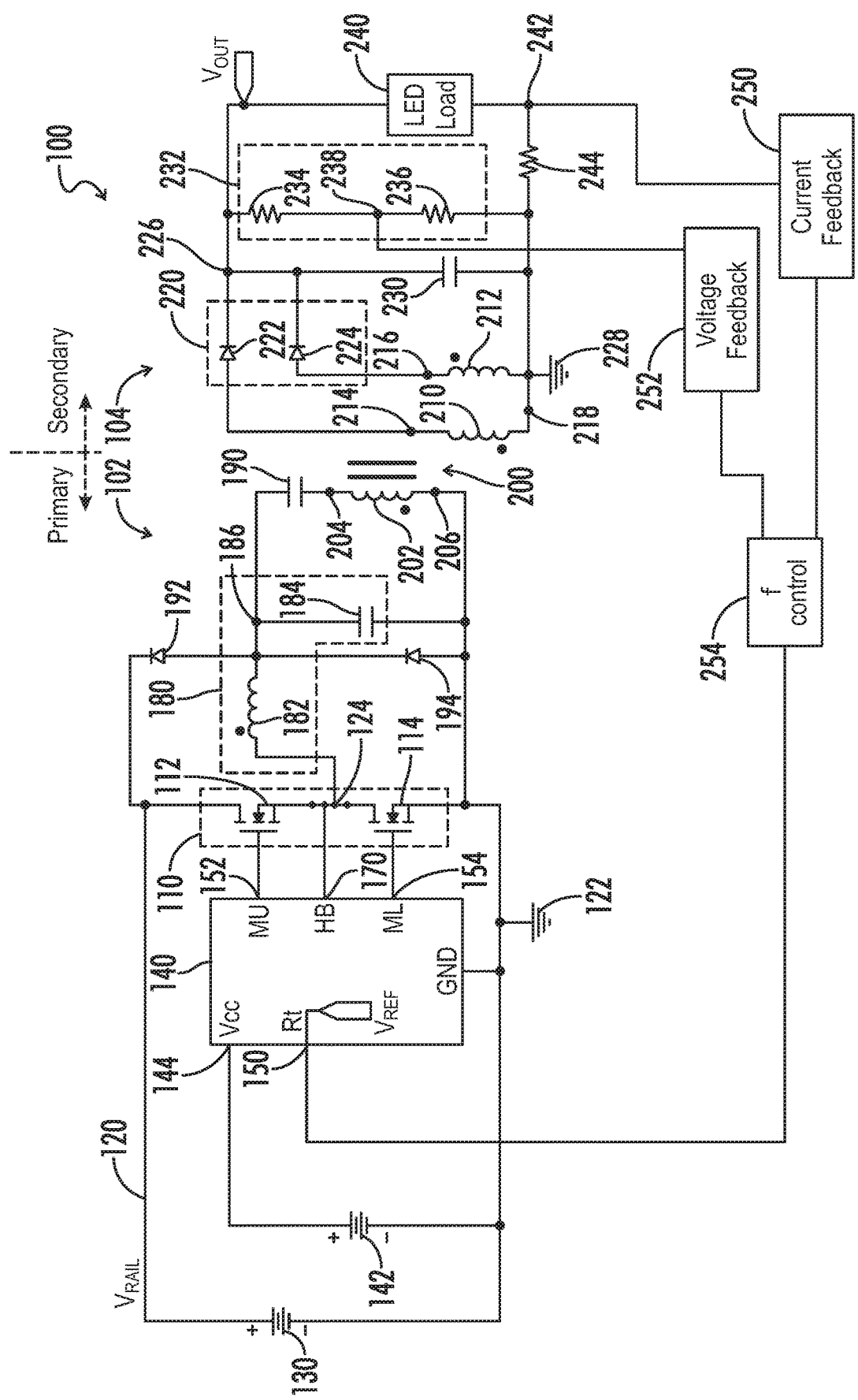
FIG. 1 is a circuit diagram representing a first embodiment of a half-bridge resonant type DC-DC converter as disclosed herein.

FIG. 1 illustrates an embodiment of a half-bridge resonant type DC-DC converter 100, which provides a constant output voltage to a load. As used herein the constant output voltage is referenced to a reference magnitude. The reference magnitude may be varied, and the constant output voltage will track the reference magnitude. The illustrated converter operates over a wide range of output load currents and is stable over the range of load currents. The converter is configured to regulate the voltage and current supplied to the load in order to maintain the output power at no more than 100 watts with an output current of no more than 8 amperes at any given time. Accordingly, the current and voltage must be controlled at the same time.

The exemplary converter 100 includes a primary circuit 102 and a secondary circuit 104, which are electrically isolated as described below. The converter includes a first switch 112 and a second switch 114 in a half-bridge switching circuit 110. The switches may be, for example, metal oxide semiconductor field effect transistors (MOSFETs) or bipolar junction transistors (WI s). In the illustrated embodiment, the two switches are n-channel MOSFETs. The half-bridge switching circuit is connected between a DC input bus 120 (also labeled as $V_{RAIL}$) and a primary circuit ground reference 122. The DC input bus may be considered as a first voltage rail; and the primary circuit ground reference may be considered as a second voltage rail. The drain of the first switch is connected to the DC input bus. The source of the first switch is connected to the drain of the second switch at a common switched node 124 of the half-bridge switching circuit. The source of the second switch is connected to the primary circuit ground reference.

In the illustrated embodiment, the voltage on the DC input bus 120 is provided by a first DC voltage source 130. In the illustrated embodiment, the first DC voltage source is illustrated as a battery; however, it should be understood that the voltage on the DC input bus may be provided by other sources, such as, for example, a power factor correction (PFC) stage, the DC output of a bridge rectifier, or the like, which are supplied from an AC source (not shown). The battery is representative of a variety of voltage sources that provide a substantially constant voltage on the DC input bus.

Each of the first switch 112 and the second switch 114 has a respective control input terminal. In the illustrated embodiment incorporating MOSFETs, the control input terminals are the gates of the two transistors. The control input terminals are driven by a self-oscillating half-bridge gate driver integrated circuit (IC) 140, which may also be referred to as a switch controller. In the illustrated embodiment, the driver IC (switch controller) may be, for example, an NCP1392B high-voltage half-bridge driver with inbuilt oscillator, which is commercially available from ON Semiconductor Company of Phoenix, Ariz. The driver IC is powered by a second DC voltage source 142 via a $V_{CC}$ input pin 144. In FIG. 1, the second DC voltage source is illustrated as a battery that provides a voltage $V_{CC}$; however, it should be understood that the second DC voltage source may also be derived from an AC source.

The driver IC (switch controller) 140 is responsive to a timing resistance connected to a timing terminal (RT) 150 to alternately apply an upper drive voltage on an upper drive terminal (MU) 152 and apply a lower drive voltage to a lower drive terminal (ML) 154. The upper output drive voltage is applied to the control input terminal of the first switch 112. The lower output drive voltage is applied to the control input terminal of the second switch 114. When the resistance applied to the timing terminal of the driver IC increases, the current flowing out of the timing terminal decreases, which causes the frequency of the drive voltages applied to the two switches to decrease. When the resistance applied to the timing terminal of the driver IC decreases, the current flowing out of the timing terminal increases, which causes the frequency of the drive voltages to increase. The driver IC may include other terminals that are not shown in FIG. 1.

The common switched node 124 of the half-bridge switching circuit 110 is connected to a half bridge connection terminal (HB) 170 of the driver IC 140. The common switched node is also connected to a first terminal of a resonant inductor 182 in a resonant circuit 180. A second terminal of the resonant inductor is connected to a first terminal of a resonant capacitor 184 at an output node 186 in the resonant circuit. A second terminal of the resonant capacitor is connected to the primary circuit ground reference 122. The resonant inductor and the resonant capacitor are the main resonant components of the resonant circuit, which is driven by the alternatingly connecting the common switched node to the DC bus 120 via the first switch 112 and to the primary circuit ground reference via the second switch 114.

The primary circuit 102 may include first and second clamping diodes 192, 194 coupled across the resonant circuit 180 to prevent the driver from going into capacitive mode switching when in a transient open load mode. A cathode of the first clamping diode is coupled to the DC input bus 120. The anode of the first clamping diode is coupled to the second terminal of the resonant inductor 182. The cathode of the second clamping diode is coupled to the second terminal of the resonant inductor 182. The anode of the second clamping diode is coupled to the primary circuit ground reference 122.

The output node 186 of the resonant circuit 180 is connected to a first terminal of a DC blocking capacitor 190. A second terminal of the DC blocking capacitor is connected to a first terminal 204 of a primary winding 202 of an output isolation transformer 200. A second terminal 206 of the primary winding of the output isolation transformer is connected to the primary circuit ground reference 122. The foregoing components on the primary circuit 102 of the half-bridge switching circuit 110 operate as a DC to AC inverter to produce an AC voltage across the primary winding of the output isolation transformer.

The output isolation transformer 200 includes a first secondary winding 210 and a second secondary winding 212. The two secondary windings are electrically isolated from the primary winding 202. As illustrated, the primary winding is electrically part of the primary circuit 102, and the secondary windings are electrically part of the secondary circuit 104. The two secondary windings have respective first terminals, which are connected at a center tap 218. Respective second terminals 214, 216 of the first and second secondary windings are connected to input terminals of a half-bridge rectifier 220. The half-bridge rectifier comprises a first rectifier diode 222 and a second rectifier diode 224. The second terminal of the first secondary winding is connected to the anode of the first rectifier diode. The second terminal of the second secondary winding is connected to the anode of the second rectifier diode. The cathodes of the two rectifier diodes are connected together at an output node 226 of the half-bridge rectifier. The center tap of the first and second secondary windings is connected to a secondary circuit ground reference 228. In other embodiments having a single, non-center-tapped secondary winding, the half-bridge rectifier with the two rectifier diodes may be replaced with a full-bridge rectifier with four rectifier diodes.

The output node 226 of the half-bridge rectifier 220 is connected to a first terminal of an output filter capacitor 230. A second terminal of the output filter capacitor is connected to the secondary circuit ground reference 228. An output voltage ($V_{OUT}$) is developed across the output filter capacitor at the output node of the half-bridge rectifier. The output node of the half-bridge rectifier is also connected to a first terminal of a load 240, which may comprise, for example, one or more light-emitting didoes (LEDs) that emit light when sufficient current passes through the LEDs. A second terminal of the load is connected to a current sensing node 242 and to the first terminal of a current sensing resistor 244. A second terminal of the current sensing resistor is connected to the secondary circuit ground reference. When an output current ($I_{OUT}$) flows through the load, the same current flows through the current sensing resistor. Accordingly, a voltage develops on the current sensing terminal that has a magnitude with respect to the secondary circuit ground reference that is proportional to the current flowing through the load. In one embodiment, the current sensing resistor has a resistance of, for example, 0.1 ohm such that the effect of the resistance of the current sensing resistor on the output current is insignificant. The output node of the half-bridge rectifier is also connected to a first terminal of a voltage divider circuit 232. The voltage divider circuit may also be referred to herein as a voltage sensing circuit. The voltage divider circuit includes a first voltage divider resistor 234 coupled in series with a second voltage divider resistor 236 between the output node of the half-bridge rectifier and the secondary circuit ground reference. The voltage divider circuit includes an output node 238 defined between the first and second voltage divider resistors. A voltage across the second resistor is seen at the output node and is representative of the load voltage across the load.

When the driver IC 140 operates to apply alternating drive voltages to the first switch 112 and the second switch 114, an AC voltage develops across the resonant capacitor 184. The voltage across the resonant capacitor may include a DC component; however, the DC blocking capacitor 190 transfers only the AC component of the energy stored in the resonant capacitor to the primary winding 202 of the output isolation transformer 200. The transferred energy is magnetically coupled from the primary winding to the electrically isolated first and second secondary windings 210, 212. The first and second rectifier diodes 222, 224 in the half-bridge rectifier 220 rectify the AC energy from the secondary windings into DC energy, which is provided on the output node 226. The DC energy is stored in the output filter capacitor 230 at a voltage determined by the amount of stored energy. Current from the output filter capacitor is provided to the load 240 at a magnitude determined by the voltage on the half-bridge rectifier output node and the resistance of the load.

Because the intensity of the light emitted by the LEDs in the load 240 is dependent on the magnitude of the current flowing through the LEDs, the current is controlled closely. The current sensing resistor 244 senses the current going through the load and develops a voltage $V_{ISENSE}$ on the current sensing node 242 proportional to the output current. The voltage representing the sensed current is fed back to a current feedback circuit 250 to provide current regulation. The load voltage is to be maintained substantially constant across differing loads. The voltage across the second voltage divider resistor is fed back to a voltage feedback circuit 252 in order to maintain a constant load voltage. In order to control the output power both the output voltage and output current must be controlled.

Outputs from both the current feedback circuit 250 and the voltage feedback circuit 252 are monitored by a frequency control circuit 254 so that the maximum output power can be set to be less than 100 watts. The frequency control circuit integrates both outputs in order to regulate a frequency of the drive IC 140. As mentioned above, if the maximum output current is high, for example, greater than 5 amperes, then sensing the current across the current sensing resistor 244 will be very lossy. Accordingly, a special, high quality and high price, current sensing resistor would need to be used for circuits which produce such a high current. Additionally, integrating the outputs of the current feedback circuit and the voltage feedback circuit can be very complicated, thus adding additional costs to production of the half-bridge resonant type DC-DC converter 100.

Figure 2:
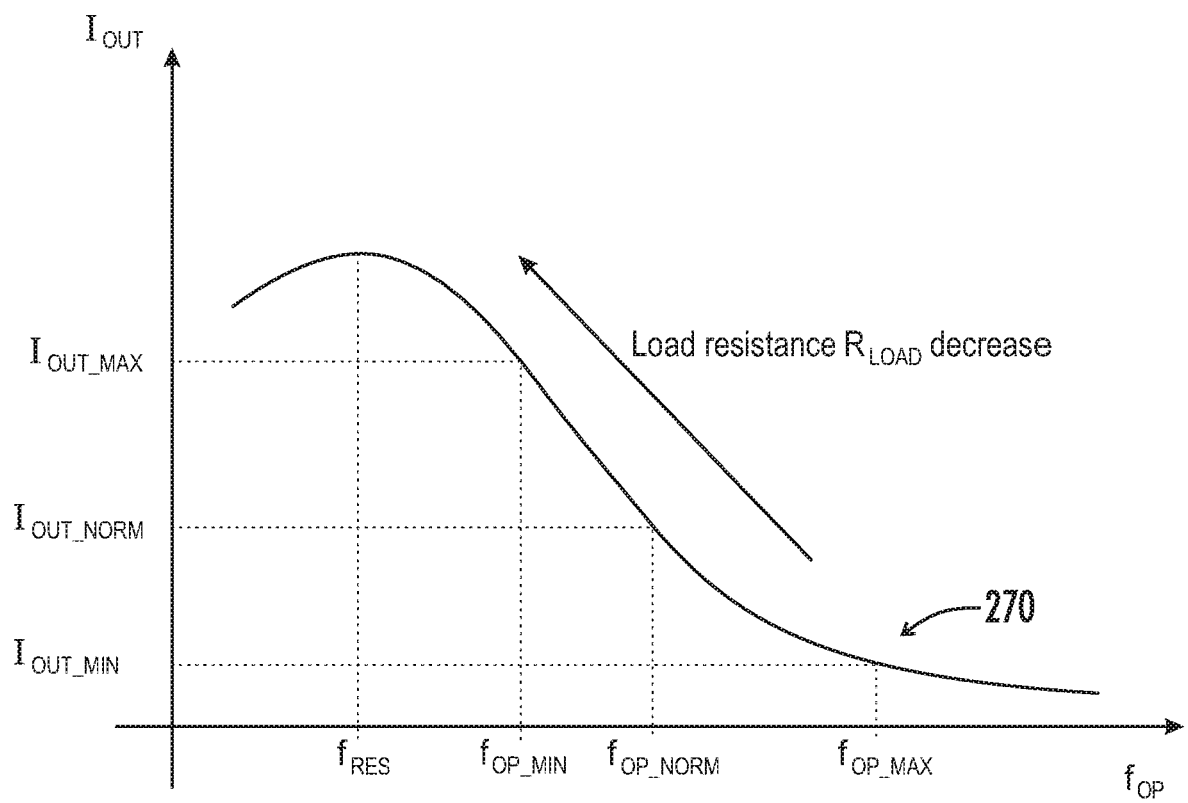
FIG. 2 is a graphical diagram representing an exemplary output current $I_{OUT}$ versus the operating frequency $f_{OP}$ of the half-bridge resonant type DC-DC converter of FIG. 1.

The relationship of the operating frequency $f_{OP}$ and the output current ($I_{OUT}$) of the driver IC 140 through the load 240 for a constant output voltage is illustrated by a graph 270 in FIG. 2, which represents a relationship between the operating frequency $f_{OP}$ and the output current ($I_{OUT}$). Normally, the normal operating frequency ($f_{OP\_NORM}$) is above a resonant frequency ($f_{RES}$) of the resonant circuit 180 in order to optimize the half-bridge resonant type DC-DC converter's 100 operation and negative voltage feedback control. The normal operating frequency corresponds to a normal operating current ($I_{OUT\_NORM}$). The relationship shows that the maximum output current ($I_{OUT\_MAX}$) corresponds to the minimum operating frequency ($f_{OP\_MIN}$). The minimum operating frequency is greater than the resonant frequency ($f_{OP\_RES}$) of the resonant circuit 180. The relationship also shows that the minimum output current ($I_{OUT\_MIN}$) corresponds to the maximum operating frequency ($f_{OP\_MAX}$). The maximum operating frequency is greater than both the resonant frequency ($f_{OP\_RES}$) and the minimum operating frequency ($f_{OP\_MIN}$) of the resonant circuit 180. The operating frequency of the driver IC 140 decreases as the load resistance $R_{LOAD}$ increases. As a result, if the minimum operating frequency ($f_{OP\_MIN}$) is controlled, then the maximum output current ($I_{OUT\_MAX}$) can be controlled without sensing the output current, as is done in FIG. 1 for the half-bridge resonant type DC-DC converter.

Figure 3:
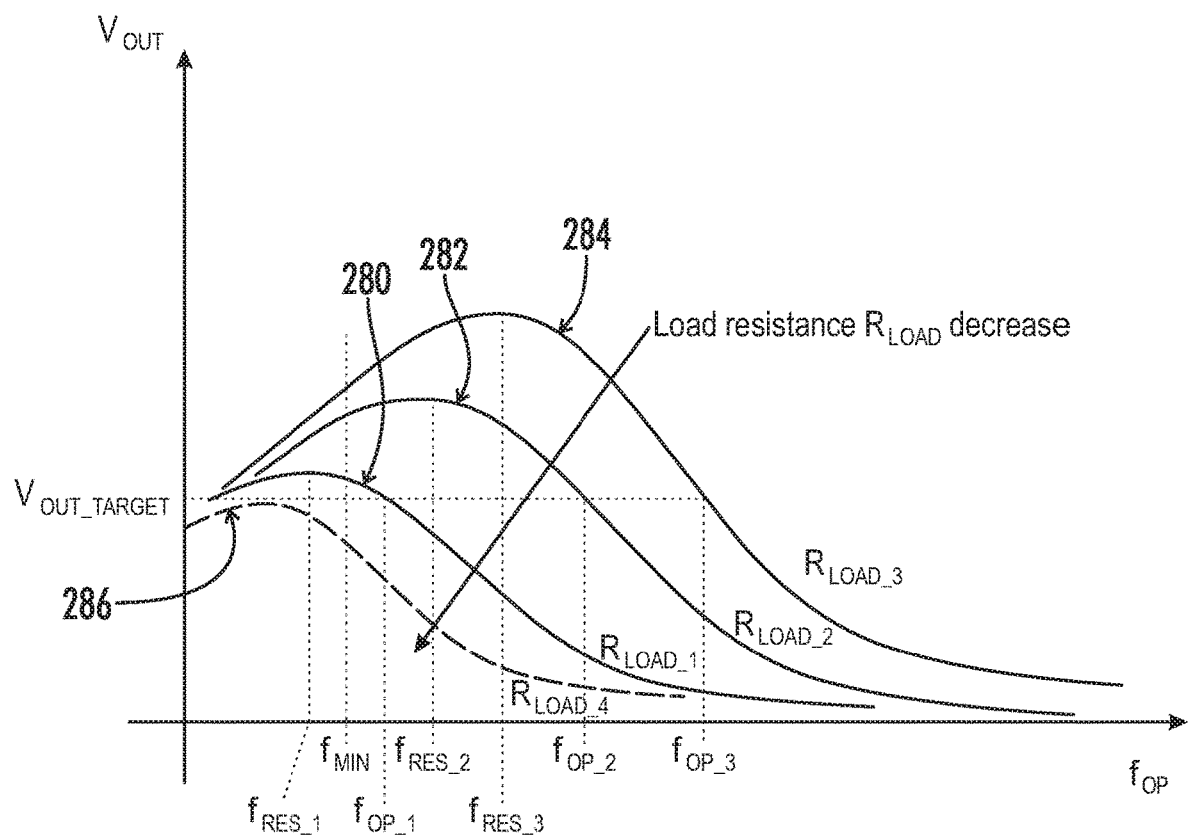
FIG. 3 is a graphical diagram representing an exemplary output voltage $I_{OUT}$ versus the operating frequency $f_{OP}$ of the half-bridge resonant type DC-DC converter of FIG. 1 for four different loads including an open load resistances.

The relationship of the operating frequency $f_{OP}$ and the output voltage $V_{OUT}$ of the driver IC 140 through the load 240 is illustrated by four graphs 280, 282, 284, 286 in FIG. 3, which represent different load conditions of the load 240. The first graph 280 is associated with a first load resistance ($R_{LOAD\_1}$) of the load 240. The second graph 282 is associated with a second load resistance ($R_{LOAD\_2}$) being greater than the first load resistance ($R_{LOAD\_1}$) of the load 240. The third graph 284 is associated with a third load resistance ($R_{LOAD\_3}$) being greater than both the first and second load resistances ($R_{LOAD\_1}$) and ($R_{LOAD\_2}$) of the load 240. Finally, the fourth graph 286 is associated with a fourth load resistance ($R_{LOAD\_4}$) being less than the first load resistance ($R_{LOAD\_1}$) of the load 240. Accordingly, the relationship between the load resistances of the load 240 is as follows: $R_{LOAD\_4} < R_{LOAD\_1} < R_{LOAD\_2} < R_{LOAD\_3}$.

The first graph 280 includes a first self-resonant frequency ($f_{RES\_1}$). The second graph 282 includes a second self-resonant frequency ($f_{RES\_2}$). The third graph 284 includes a third self-resonant frequency ($f_{RES\_3}$). As shown in FIG. 3, the relationship between the self-resonant frequencies is as follows: $f_{RES\_1} < f_{RES\_2} < f_{RES\_3}$.

In order to maintain the constant target output voltage ($V_{OUT\_TARGET}$), the operating frequency must be adjusted between a first operating frequency ($f_{OP\_1}$) for the first load resistance ($R_{LOAD\_1}$), a second operating frequency ($f_{OP\_2}$) for the second load resistance ($R_{LOAD\_2}$), and a third operating frequency ($f_{OP\_3}$) for the third load resistance ($R_{LOAD\_3}$), which is controlled by the voltage feedback circuit 252.

When the resistance of the load 240 reduces too much, for example, to the fourth load resistance ($R_{LOAD\_4}$), as illustrated by graph 286, then the output voltage ($V_{OUT}$) will always be less than the target output voltage ($V_{OUT\_TARGET}$) because the operating frequency is limited by the minimum operating frequency ($f_{OP\_MIN}$). The reason the output voltage ($V_{OUT}$) will always be less than the target output voltage ($V_{OUT\_TARGET}$) is because the output current ($I_{OUT}$) is limited by the minimum operating frequency ($f_{OP\_MIN}$).

Figure 4:
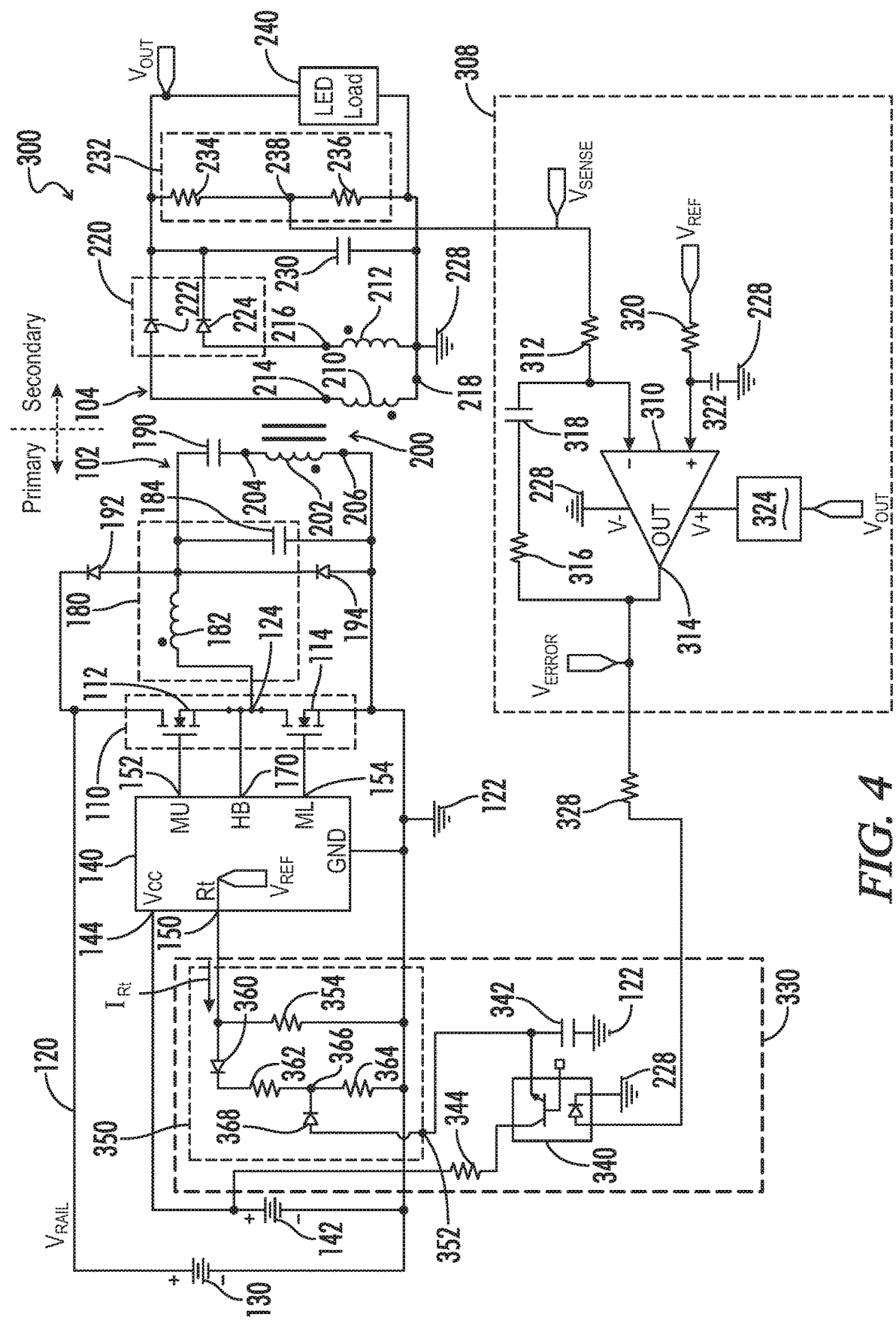
FIG. 4 is a circuit diagram representing a second embodiment of a half-bridge type DC-DC converter as disclosed herein.

FIG. 4 illustrates a modified half-bridge resonant type DC-DC converter 300, which eliminates the current sensing resistor 244 and incorporates a revised frequency control method that accurately sets the maximum and minimum operating frequencies of the driver IC 140 in order to limit the output current and output power of the half-bridge resonant type DC-DC converter. The frequency control method also responds to a feedback circuit to adjust the operating frequency in order to maintain a constant pre-set output voltage. As described below, the DC-DC converter of FIG. 4 uses voltage superposition to control the operating frequency $f_{OP}$.

The modified half-bridge resonant type DC-DC converter 300 of FIG. 4 has certain components corresponding to components in the half-bridge resonant type DC-DC converter 100, which operate in the same or similar manner. The corresponding components are identified with the same reference numbers in FIG. 4 as in FIG. 1.

The modified half-bridge resonant type DC-DC converter 300 includes a feedback circuit 308 configured to regulate the output voltage ($V_{OUT}$) at a reference voltage ($V_{REF}$). The reference voltage may also be referred to herein as a reference signal. The second voltage divider resistor 236 senses the voltage across the load 240 and develops a sensor output signal ($V_{SENSE}$) on the output node 238 proportional to an output voltage across the load. The sensor output signal is fed back to a proportional integral (PI) voltage control loop to provide voltage regulation. In FIG. 3, the PI current control loop includes an operational amplifier (OPAMP) 310 having an inverting (−) input terminal, having a non-inverting (+) input terminal, and having an output (OUT) on an output terminal 314. The output node of the voltage divider circuit 232 is connected to the inverting input of the operational amplifier via a series resistor 312. A feedback resistor 316 and a feedback capacitor 318 are connected in series between the output terminal of the operational amplifier and the inverting input. The series resistor and the feedback resistor determine the proportional gain of the PI loop. The series resistor and the feedback capacitor determine the crossover frequency of the PI loop. A reference voltage ($V_{REF}$) is connected to the non-inverting input of the operational amplifier via a buffer resistor 320 and a buffer capacitor 322. The buffer resistor and the buffer capacitor are used to buffer the reference voltage.

The magnitude of the reference voltage is selected to produce a desired load voltage through the load. The reference voltage may be a fixed reference voltage to provide a constant load voltage. As indicated above, the load voltage is maintained constant relative to the reference voltage. If the reference voltage changes to a new magnitude, the load voltage is maintained constant relative to the new magnitude. The operational amplifier is responsive to a difference in the magnitudes of the reference voltage $V_{REF}$ and the sensor output signal $V_{SENSE}$ to generate an error signal $V_{ERROR}$. The error signal is used to control the operational frequency of the driver IC 140 as described below. The operational amplifier may also be considered as a comparator because the operational amplifier compares the magnitudes of the two input signals and generates an output signal having a magnitude responsive to a difference between the magnitudes of the two input signals.

The operational amplifier has a positive power terminal ($V_+$) and a negative power terminal ($V_-$) for powering the operational amplifier. The power at the positive power terminal is provided by the output voltage ($V_{OUT}$) of the half-bridge resonant type DC-DC converter 300 through a voltage regulator 324. The negative power terminal is coupled to the secondary circuit ground reference 228.

During operation of the operational amplifier, when the sensor output signal $V_{SENSE}$ is lower than the reference voltage $V_{REF}$ the error signal $V_{ERROR}$ at the output terminal 314 will increase. When the sensor output signal $V_{SENSE}$ is greater than the reference voltage $V_{REF}$ the error signal $V_{ERROR}$ at the output terminal will decrease. The error signal is fed to a current control circuit 330 to achieve close loop frequency control in order to maintain a constant output voltage when the load 240 changes.

The output terminal 314 of the operational amplifier 310 is connected to the input stage of an optocoupler 340 of the current control circuit 330 via a series resistor 328. The optocoupler may also be referred to as an opto isolator, an optical isolator or an optocoupler. The input stage of the optocoupler has an internal light generation device (e.g., an LED) coupled to the input of the optocoupler. The light generation device is responsive to a voltage applied to the input stage to generate light. The applied voltage is referenced to the secondary circuit ground reference 228 to which the light generation stage is connected. The generated light is propagated internally to a light-responsive base of a phototransistor in an output stage within the same component. The phototransistor has an emitter and a collector. The emitter is connected to the primary circuit ground reference 122 through an optocoupler capacitor 342. The impedance of the phototransistor between the collector and the emitter in the output stage of the optocoupler is responsive to the light generated by the input stage. Thus, the impedance of the output stage is responsive to the voltage applied to the input stage. In the illustrated embodiment, increasing the voltage applied to the input stage decreases the impedance of the output stage, and decreasing the voltage applied to the input stage increases the impedance of the output stage. The optocoupler electrically isolates the secondary circuit voltages and the secondary circuit ground reference in the secondary circuit 104 from the primary circuit voltages and the primary circuit ground reference in the primary circuit 102.

The collector of the phototransistor in the output stage of the optocoupler 340 is connected to the second DC voltage source 142 through an optocoupler resistor ($R_3$) 344.

The emitter of the phototransistor of the output stage of the optocoupler 340 is further connected to an input node 352 of a frequency control block 350 of the current control circuit 330. The frequency control block includes a minimum frequency resistor ($R_{min}$) 354 coupled between the timing terminal (RT) 150 of the driver IC 140 and the primary circuit ground reference 122. The frequency control block further includes a first diode (D1) 360, a first maximum frequency resistor ($R_1$) 362, and a second maximum frequency resistor ($R_2$) 364. An anode of the first diode is coupled to the timing terminal (RT) of the driver IC. The first and second maximum frequency resistors are coupled in series between a cathode of the first diode and the primary circuit ground reference. A node 366 defined between the first and second maximum frequency resistors is coupled to a cathode of a second diode 368 of the frequency control block. An anode of the second diode is coupled to the input node of the frequency control block.

The current control circuit 330 receives the error signal $V_{ERROR}$ and adjusts the operating frequency of the driver IC 140. The frequency control driver IC is directly proportional to the current that flows out the timing terminal (Rt) 150 of the driver IC. The frequency follows the equation:

$$f_{OP} = I_{Rt} \cdot 250(\text{KHz/mA}) = \frac{V_{REF}}{R_t} \cdot 250(\text{KHz/mA}) \quad (1)$$

$R_t$ is the total resistance connected to the timing terminal (Rt). The reference voltage $V_{REF}$ is the internal reference voltage of the driver IC 140 and may, for example, in certain optional embodiments be equal to 3.5 volts.

The total current ($I_{Rt}$) flowing out of the timing terminal (Rt) can be expressed as:

$$I_{Rt} = I_{R_{min}} + I_{D1} = \frac{V_{REF}}{R_{min}} + \frac{V_{REF} - V_2}{R_1} \quad (2)$$

The voltage ($V_{R2}$) across the second maximum frequency resistor ($R_2$) 364 can be expressed as by applying the superposition principle:

$$V_{R2} = V_{REF} \cdot \frac{R_2}{R_1 + R_2} + V_{cc} \cdot \frac{R_2}{R_3 + R_{OPTO}(V_{ERROR}) + R_2} \quad (3)$$

The OPTO emitter resistance, $R_{OPTO}$, is a function of $V_{ERROR}$.

$$R_{OPTO}(V_{ERROR}) = K \cdot \frac{R_{OPTO\_MAX}}{V_{ERROR}} \quad (4)$$

K is a gain constant. $R_{OPTO\_MAX}$ is a constant.

Substituting $V_{R2}$ with equations (3) and (4) can be expressed as:

$$I_{Rt} = \frac{V_{REF}}{R_{min}} + \frac{V_{REF}}{R_1 + R_2} - \frac{V_{cc}}{R1} \cdot \frac{R_2}{R_3 + K \cdot \frac{R_{OPTO\_MAX}}{V_{ERROR}} + R_2} \quad (5)$$

Substituting equation (5) into equation (1) can be expressed as:

$$f_{OP} = \left( \frac{V_{REF}}{R_{min}} + \frac{V_{REF}}{R_1 + R_2} - \frac{V_{cc}}{R_1} \times \frac{R_2}{R_3 + K \frac{R_{opto\_max}}{V_{error}} + R_2} \right) \cdot 250\left(\frac{\text{KHz}}{\text{mA}}\right) \quad (6)$$

From equation (6) we can see that the operating frequency $f_{OP}$ is a function of the error signal $V_{ERROR}$ and the second DC voltage source ($V_{CC}$) 142. As illustrated in FIG. 4, the second DC voltage source ($V_{CC}$) is a fixed DC power supply. Accordingly, the operating frequency $f_{OP}$ is mainly controlled by the feedback circuit 308 output (i.e., the error signal $V_{ERROR}$).

If the error voltage $V_{ERROR}$ is too high, it will drive too much current through the second diode ($D_2$) 368. This will in turn saturate the emitter of the optocoupler 340 and will force the emitter resistance to be very close to zero. As a result, there will be a large voltage across the second maximum frequency resistor ($R_2$) 364. If the voltage across the second maximum frequency resistor is greater than the reference voltage $V_{REF}$, for example $V_{REF}$ may equal 3.5 volts, then the first diode (D1) 360 will stop conducting current. From equation (6) we can see the minimum operating frequency ($f_{MIN}$) will happen at this condition, which can be defined as follows, when $$K \cdot \frac{R_{opto\_max}}{V_{error}} = 0 : . \quad (7)$$

$$f_{OP\_MIN} = \left( \frac{V_{REF}}{R_{min}} + \frac{V_{REF}}{R_1 + R_2} - \frac{V_{cc}}{R_1} \times \frac{R_2}{R_3 + R_2} \right) \cdot 250\left(\frac{\text{KHz}}{\text{mA}}\right)$$

From equation (7) we can see that when the error signal $V_{ERROR}$ is high and the optocoupler 340 is saturated, the minimum frequency is mainly controlled by the second DC voltage source ($V_{CC}$).

Before the feedback circuit 308 starts working, the error signal $V_{ERROR}$ is zero. Accordingly, the second diode ($D_2$) 368 doesn't conduct any current and the emitter of the optocoupler 340 is open (i.e., not conducting). As a result, there is no voltage across the optocoupler capacitor 342 which causes the second diode ($D_2$) to be negatively biased and thus not conduct any current. This condition is when the maximum frequency of the driver IC 140 happens, defined as follows:

$$f_{OP\_MAX} = \left( \frac{V_{REF}}{R_{min}} + \frac{V_{REF}}{R_1 + R_2} \right) \cdot 250\left(\frac{\text{KHz}}{\text{mA}}\right) \quad (8)$$

From the graph 270 (i.e., the current gain curve), shown in FIG. 2, we can see that the maximum output current ($I_{OUT\_MAX}$) is controlled by the minimum operating frequency ($I_{OP\_MIN}$) of the driver IC 140. Accordingly, we can limit the maximum output current ($I_{OUT\_MAX}$) by controlling the minimum operating frequency ($I_{OP\_MIN}$) in order to eliminate the current feedback circuit 250. In other words, the current feedback circuit 250 is not needed to control the maximum output current when the load resistance ($R_{LOAD}$) changes. From equation (7), we know that the minimum operating frequency ($I_{OP\_MIN}$) and the maximum output current ($I_{OUT\_MAX}$) can be controlled by controlling the second DC voltage source ($V_{CC}$).

The voltage control logic associated with the output voltage $V_{OUT}$ with the driver IC 140 as delivered to the load 240 can be described as follows:

1) When the load 240 changes from a larger resistance to a smaller resistance, the transient output voltage $V_{OUT}$ will be less than the reference voltage $V_{REF}$, which will cause the error signal $V_{ERROR}$ to increase. From equation (7), we can see that the operating frequency $f_{OP}$ will decrease. From the graphs in FIG. 3, we know that the output voltage $V_{OUT}$ will increase to the target output voltage $V_{OUT\_TARGET}$.

2) When the load 240 changes from a smaller resistance to a smaller resistance, the transient output voltage $V_{OUT}$ will be higher than the reference voltage $V_{REF}$, which will cause the error signal $V_{ERROR}$ to decrease. From equation (7), we can see that the operating frequency $f_{OP}$ will increase. From the graphs in FIG. 3, we know that the output voltage $V_{OUT}$ will decrease to the target output voltage $V_{OUT}$_TARGET.

3) When the resistance of the load 240 keeps reducing, the error signal $V_{ERROR}$ will keep increasing and the operating frequency will keep decreasing until the optocoupler 340 is saturated. Once saturated, the driver IC 140 will work at the minimum operating frequency $f_{OP\_MIN}$, the output current $I_{OUT}$ will be the maximum, and the output voltage $V_{OUT}$ will be less than the target output voltage $V_{OUT\_TARGET}$.

As discussed above, the minimum operating frequency $f_{OP\_MIN}$ can be controlled by the second DC voltage source ($V_{CC}$) 142, as well as the maximum output current $I_{OUT\_MAX}$ while the resistance of the load 240 changes.

Figure 5:
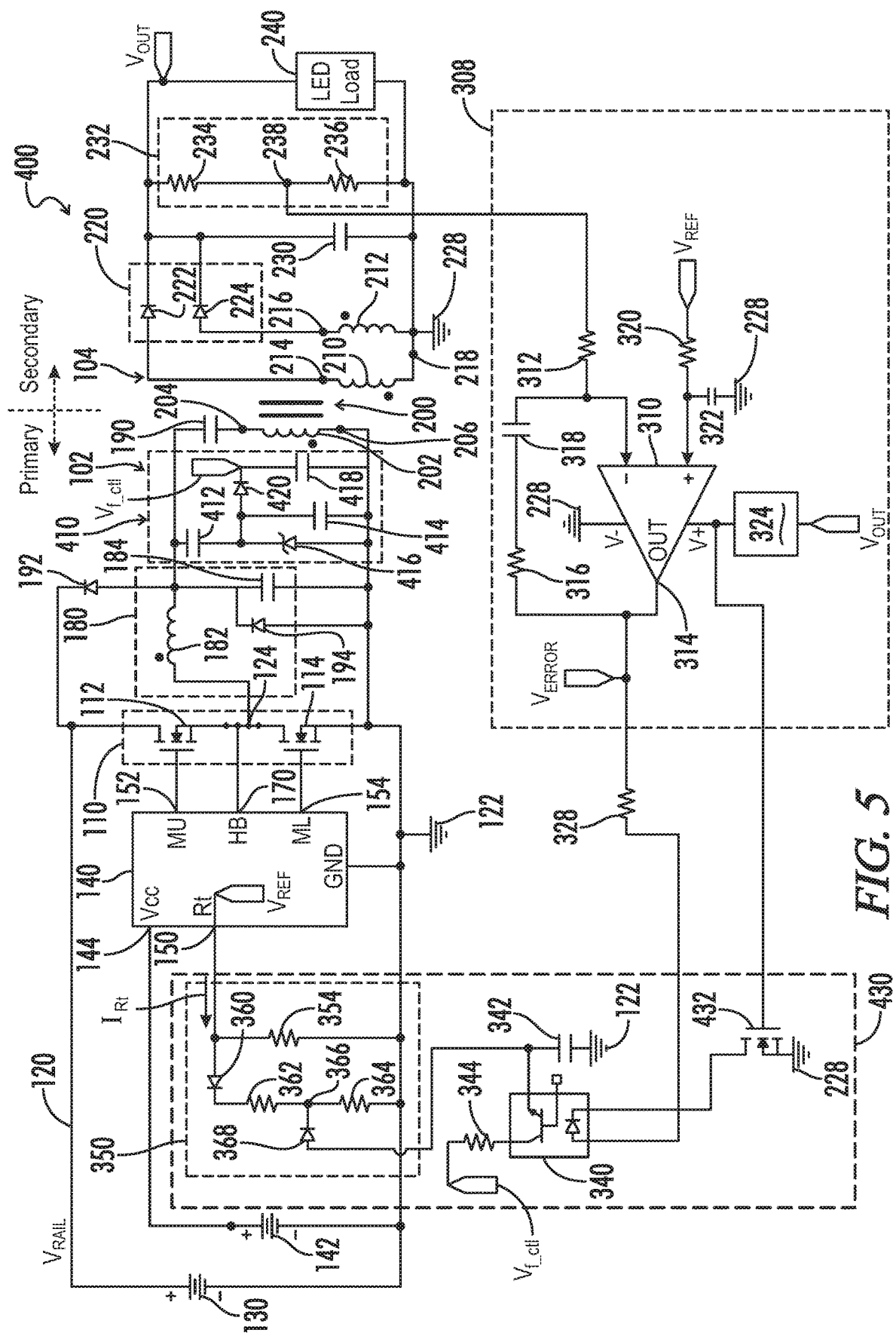
FIG. 5 is a circuit diagram representing a third embodiment of a half-bridge type DC-DC converter as disclosed herein.

To achieve the above control, an improved half-bridge resonant type DC-DC converter 400 has been developed for frequency control that is dependent on the output voltage $V_{OUT}$, as shown in FIG. 5. The improved half-bridge resonant type DC-DC converter 400 of FIG. 5 has certain components corresponding to components in the modified half-bridge resonant type DC-DC converter 300, which operate in the same or similar manner. The corresponding components are identified with the same reference numbers in FIG. 5 as in FIG. 4.

The improved half-bridge resonant type DC-DC converter 400 includes a frequency control power supply circuit 410 which provides the power supply via a frequency control voltage ($V_{f\_ctl}$) to a frequency control circuit 430 of the improved half-bridge resonant type DC-DC converter 400. The frequency control voltage may also be referred to herein as a frequency control power signal.

Similar to the modified half-bridge resonant type DC-DC converter 300, the frequency control circuit 430 includes the optocoupler 340, the optocoupler capacitor 342, and the optocoupler resistor 344, as well as the frequency control block 350 which includes the minimum frequency resistor ($R_{min}$) 354, the first maximum frequency resistor ($R_1$) 362, the second maximum frequency resistor ($R_2$) 364, the first diode ($D_1$) 360, and the second diode ($D_2$) 368. The collector of the phototransistor in the output stage of the optocoupler 340 receives the frequency control voltage ($V_{f\_ctl}$) from the frequency control power supply circuit 410 through the optocoupler resistor ($R_3$) 344.

Similar to the modified half-bridge resonant type DC-DC converter 300, the output terminal 314 of the operational amplifier 310 is connected to the input stage of an optocoupler 340 of the current control circuit 330 via the series resistor 328. As discussed above, the input stage of the optocoupler has an internal light generation device (e.g., an LED) coupled to the input of the optocoupler. The light generation device is responsive to a voltage applied to the input stage to generate light. The applied voltage is referenced to the secondary circuit ground reference 228 through a switch 432 of the frequency control circuit 430. The switch may be, for example, a metal oxide semiconductor field effect transistor (MOSFET) or a bipolar junction transistor (BJT). In the illustrated embodiment, the switch is an n-channel MOSFET. In certain optional embodiments, the gate of the switch is coupled to an output of the voltage regulator 324, the drain is coupled to the input stage of the optocoupler 340, and the source is coupled to the secondary circuit ground reference 228.

The switch 432 of the frequency control circuit 430 provides redundant protection from output short circuit. When the output is shorted, the gate drive of the switch 432 will be zero and cause the optocoupler 340 to not conduct any current. As a result, the second diode ($D_2$) 368 will not conduct, the driver IC 140 will operate at the maximum operating frequency $f_{OP\_MAX}$, and the output current $I_{OUT}$ will be minimized.

The frequency control power supply circuit 410 is a simple voltage divider circuit coupled across the resonant capacitor 184 of the resonant circuit 180 and consists mainly of a first voltage divider capacitor ($C_1$) 412, a second voltage divider capacitor ($C_2$) 414, and a clamping diode ($D_3$) 416. The first voltage divider capacitor ($C_1$) 412 and the second voltage divider capacitor ($C_2$) 414 form a voltage divider circuit. The clamping diode ($D_3$) 416 is implemented to clamp the voltage across the second voltage divider capacitor ($C_2$) 414. The frequency control power supply circuit 410 may further include a buffer capacitor ($C_3$) 418 charged through a fourth diode ($D_4$) 420. The clamping diode ($D_3$) 416 also functions as a rectifier diode because it forces the voltage across the second voltage divider capacitor ($C_2$) 414 to be a half-rectified sine wave with a peak value clamped by the clamping diode ($D_3$) 416 in a transient situation.

The first voltage divider capacitor ($C_1$) 412 and the second voltage divider capacitor ($C_2$) 414 are coupled in parallel with the resonant capacitor 184 which has a voltage ($V_{C\_RES}$) that is directly proportional to the primary winding 202 of the output isolation transformer 200 because the capacitance of the DC blocking capacitor 190 is very large and its AC impedance is very small, accordingly, the AC voltage is almost zero.

The voltage ($V_{TXP}$) associated with the primary winding 202 of the output isolation transformer 200 is directly proportional to the voltage associated with the secondary windings 210, 212 which is clamped by the output voltage $V_{OUT}$. As a result, the voltage of the primary winding 202 and the voltage ($V_{C\_RES}$) of the resonant capacitor 184 are directly proportional to the output voltage $V_{OUT}$. The voltage relationship between the primary winding 202, the resonant capacitor 184, and the output voltage is:

$$V_{Tx_p} = V_{C\_RES} = N_{ps} \times V_{OUT} \quad (9)$$

where $N_{ps}$ is the turns ratio between the primary winding and the secondary winding. The voltage relationship between the first voltage divider capacitor ($C_1$) 412 and the second voltage divider capacitor ($C_2$) 414 is:

$$V_{C2} = \frac{C_1}{C_2 + C_1} \times V_{C\_RES} \times 2 = \frac{C_1}{C_2 + C_1} \times N_{ps} \times V_{OUT} \times 2 \quad (10)$$

From equation (10) and FIG. 5, we can see that the voltage across the second voltage divider capacitor ($C_2$) 414 is equal to the frequency control voltage $V_{f\_ctl}$ (i.e., the output of the frequency control power supply circuit 410).

The output of the frequency control power supply circuit 410 (i.e., the frequency control voltage $V_{f\_ctl}$) is fed to the frequency control circuit 430. The frequency control voltage ($V_{f\_ctl}$) is received by the output stage of the optocoupler 340. As previously mentioned above, the output stage of the optocoupler 340 comprises a phototransistor having an emitter and a collector. The emitter is connected to the primary circuit ground reference 122 through the optocoupler capacitor 342. The collector receives the frequency control voltage ($V_{f\_ctl}$) through the optocoupler resistor 344. This means that the frequency control voltage ($V_{f\_ctl}$) should replace the second DC voltage source ($V_{CC}$) 142 in equation (6) as follows:

$$f_{OP} = \left( \frac{V_{REF}}{R_{min}} + \frac{V_{REF}}{R_1 + R_2} - \frac{V_{f\_ctl}}{R_1} \times \frac{R_2}{R_3 + K \frac{R_{opto\_max}}{V_{error}} + R_2} \right) \cdot 250 \left( \frac{KHz}{mA} \right) \quad (11)$$

Because the second voltage divider capacitor ($C_2$) 414 is equal to the frequency control voltage $V_{f\_ctl}$ we can substitute equation (10) into equation (11) as follows:

$$f_{op} = \left( \frac{V_{REF}}{R_{min}} + \frac{V_{REF}}{R_1 + R_2} - \frac{C_1}{C_2 + C_1} \times N_{ps} \times V_{out} \times \right.$$

$$\left. 2 \times \frac{1}{R_1} \times \frac{R_2}{R_3 + K \frac{R_{opto\_max}}{V_{eror}} + R_2} \right) \cdot 250 \left( \frac{KHz}{mA} \right) \quad (12)$$

From equation (12) we can see that the operating frequency $f_{OP}$ is dependent on the impedance of the optocoupler 340 and the output voltage $V_{OUT}$.

As discussed above with regard to FIG. 3, and particularly graph 286, when the output is overloaded (e.g., the output resistance is reducing), the voltage gain, illustrated by graph 286, will be smaller and accordingly the voltage feedback control (via the feedback circuit 308) will not be able to maintain the target output voltage $V_{OUT\_TARGET}$ as set by the reference voltage $V_{REF}$. As a result, the output from the OPAMP 310 (i.e., the error signal $V_{ERROR}$) will be saturated at a high output. This high error signal $V_{ERROR}$ will drive a large current into the input stage of the optocoupler 340 through the series resistor 328 and saturate the emitter of the output stage of the optocoupler. As a result, the emitter resistance of the optocoupler 340 will be nearly zero.

$$K \cdot \frac{R_{opto\_max}}{V_{error}} = 0 \quad (13)$$

In this overloaded situation, equation (12) can be simplified as:

$$f_{OP\_OVERLOAD} = \quad (14)$$

$$\left( \frac{V_{REF}}{R_{min}} + \frac{V_{REF}}{R_1 + R_2} - \frac{C_1}{C_2 + C_1} \times N_{ps} \times V_{out} \times 2 \times \frac{1}{R_1} \times \frac{R_2}{R_3 + R_2} \right) \cdot 250$$

$$\left( \frac{KHz}{mA} \right)$$

From equation (14), we can see that when the output is overloaded, the operating frequency $f_{OP}$ is purely dependent on the output voltage $V_{OUT}$ only. Accordingly, the operating frequency $f_{OP}$ in the overloaded situation changes based on the output voltage $V_{OUT}$ or load 240.

As the output 240 becomes more and more overloaded, the output voltage $V_{OUT}$ will become smaller and smaller. As the output voltage $V_{OUT}$ becomes smaller, the operating frequency $f_{OP}$ will become higher. As the operating frequency $f_{OP}$ will becomes higher, the output current $I_{OUT}$ will become smaller, as shown in FIG. 2.

Accordingly, the improved half-bridge resonant type DC-DC converter 400 dynamically controls the minimum operating frequency $f_{OP\_MIN}$ over the load range in the overloaded situation.

Figure 6:
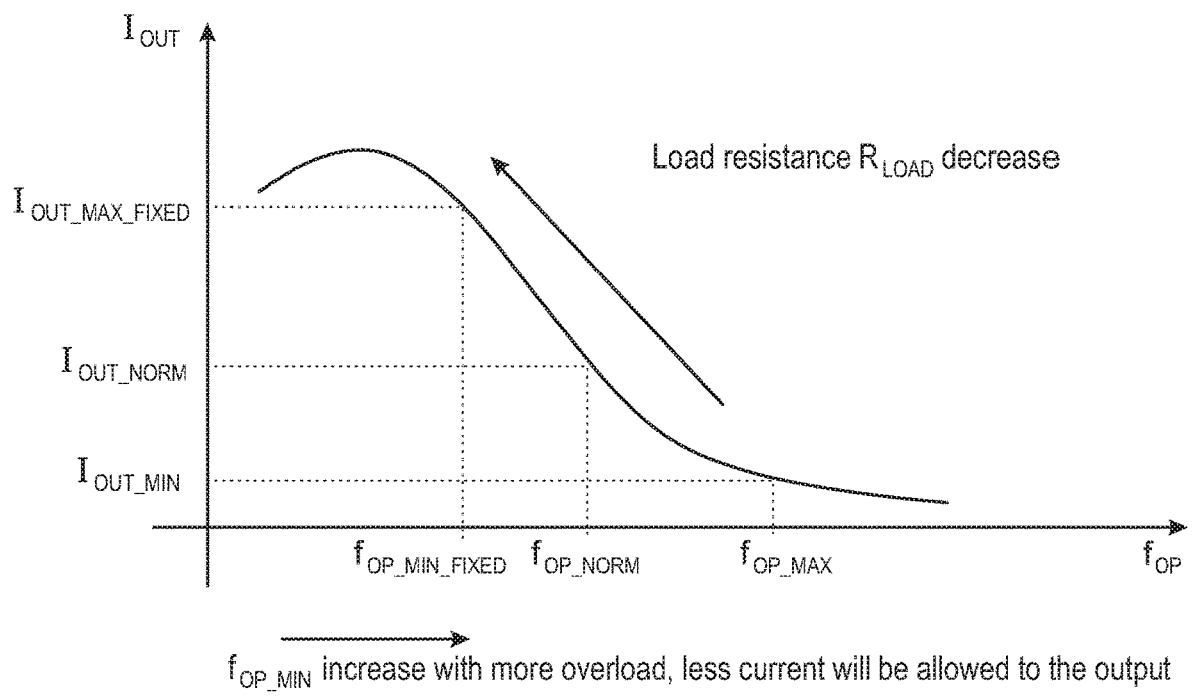
FIG. 6 is a graphical diagram representing an exemplary output current $I_{OUT}$ versus frequency $f_{OP}$ of the half-bridge resonant type DC-DC converter of FIG. 5.

The advantage of this dynamic minimum operating frequency control method over a traditional fixed minimum operating frequency is that the dynamic minimum operating frequency control will better limit the current driven out to the load 240 in the overloaded situation than the fixed minimum operating frequency, as shown in FIG. 6.

Referring to FIG. 6, we can see that if we set a fixed minimum operating frequency $f_{OP\_MIN\_FIXED}$, then the output current will be controlled at a maximum fixed output current $I_{OUT\_MAX\_FIXED}$, which can be less than 8 amperes (e.g., the maximum allowable output current by UL requirements). This issue, however, is that the maximum output current might be very high, for example, 7 amperes, which will require certain design consideration to be taken into account when selecting the components of the improved half-bridge resonant type DC-DC converter 400. Such a high output current will require overdesign of certain circuit components, such as, the first rectifier diode 222, the second rectifier diode 224, the output transformer wire size, and the wire size of the resonant inductor 182. This overdesign will increase the product cost and size, which is not desirable in a practical design.

With the dynamic minimum operating frequency control method, the minimum operating frequency $f_{OP\_MIN}$ will continue to increase with more overloading in order to decrease the maximum output current $I_{OUT\_MAX}$. By employing this dynamic minimum operating frequency control method the maximum output current $I_{OUT\_MAX}$ can be designed practically so as to not put too much stress on the components of the improved half-bridge resonant type DC-DC converter 400.

For example, for a 100 Watt, 24 volt output driver, the maximum output current ($I_{OUT\_MAX}$) can be set to 4 amperes when output is in regulation or load 240 is in a normal range. If we use fixed minimum frequency design when in an overloaded situation, then the output current ($I_{OUT}$) could go up to 7 amperes with a 2 ohm output load resistance at an output voltage ($V_{OUT}$) of 14 volts. However, if we use dynamic minimum operating frequency control method, as disclose herein, then the output current ($I_{OUT}$) can only go up to 5 amperes when in the overloaded situation with 2 ohm output load resistance at an output voltage ($V_{OUT}$) of 10 volts. A 5 amperes maximum output current ($I_{OUT\_MAX}$) requires much less overdesign for the circuit components than does a 7 amperes maximum.

The frequency control power supply circuit 410 has the added benefit of protecting against an output short circuit fault situation. When the output is shorted, the output transformer primary voltage will be zero, which will cause the voltage ($V_{C\_RES}$) of the resonant capacitor 184 to be zero as well. As a result, the output the frequency control voltage ($V_{f\_ctl}$) of the frequency control power supply circuit 410 will be zero and will force the driver IC 140 to operate at the maximum operating frequency defined by equation (8).

To facilitate the understanding of the embodiments described herein, a number of terms are defined below. The terms defined herein have meanings as commonly understood by a person of ordinary skill in the areas relevant to the present invention. Terms such as "a," "an," and "the" are not intended to refer to only a singular entity, but rather include the general class of which a specific example may be used for illustration. The terminology herein is used to describe specific embodiments of the invention, but their usage does not delimit the invention, except as set forth in the claims. The phrase "in one embodiment," as used herein does not necessarily refer to the same embodiment, although it may.

The term "circuit" means at least either a single component or a multiplicity of components, either active and/or passive, that are coupled together to provide a desired function. Terms such as "wire," "wiring," "line," "signal," "conductor," and "bus" may be used to refer to any known structure, construction, arrangement, technique, method and/or process for physically transferring a signal from one point in a circuit to another. Also, unless indicated otherwise from the context of its use herein, the terms "known," "fixed," "given," "certain" and "predetermined" generally refer to a value, quantity, parameter, constraint, condition, state, process, procedure, method, practice, or combination thereof that is, in theory, variable, but is typically set in advance and not varied thereafter when in use.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

The previous detailed description has been provided for the purposes of illustration and description. Thus, although there have been described particular embodiments of a new and useful invention, it is not intended that such references be construed as limitations upon the scope of this invention except as set forth in the following claims.

What is claimed is:

1. A resonant power converter, comprising:
    first and second switching elements coupled across a direct current (DC) power source;
    a resonant circuit coupled between an isolation transformer primary winding and an output node defined between the first and second switching elements, the resonant circuit including a resonant capacitor;
    a voltage sensing circuit coupled to a secondary winding of the isolation transformer and configured to provide a sensor output signal representative of an output voltage across a load; and
    a feedback circuit configured to generate an error signal responsive to a difference between the sensor output signal and a reference signal corresponding to a constant target output voltage;
    a controller comprising a frequency control input terminal, the controller configured to generate drive signals to the first and second switching elements at a determined operating frequency; and
    a frequency control circuit coupled between the feedback circuit and the frequency control input terminal of the controller, the frequency control circuit configured to set a minimum operating frequency and a maximum operating frequency of the controller, and to dynamically adjust the operating frequency of the controller with respect to the constant target output voltage.

2. The resonant power converter of claim 1, further comprising:
    a frequency control power supply circuit coupled in parallel with the resonant capacitor, the frequency control power supply circuit configured to provide a frequency control power signal representative of a voltage across the resonant capacitor; and
    wherein the frequency control circuit is configured to dynamically adjust the minimum operating frequency of the drive signals of the controller based on the frequency control power signal at least during an overload situation of the load.

3. The resonant power converter of claim 2, wherein:
    the voltage across the resonant capacitor is directly proportional to the output voltage across the load.

4. The resonant power converter of claim 2, wherein:
    the frequency control circuit is further configured to apply a first resistance between the frequency control input terminal and a primary side ground, thereby defining the minimum operating frequency associated with a maximum output current to the load during a normal operating situation.

5. The resonant power converter of claim 4, wherein:
    the overload situation is associated with a resistance of the load reducing below a threshold whereby the output voltage cannot be maintained at the reference signal; and
    the normal operating situation is associated with the resistance of the load being above the threshold.

6. The resonant power converter of claim 4, wherein:
    the frequency control circuit is configured to apply a second resistance between the frequency control input terminal and the primary side ground, the combination of the first resistance and the second resistance thereby defining a maximum operating frequency associated with a minimum output current to the load; and
    the controller is configured to regulate the operating frequency of the first and second switching elements between the maximum and minimum operating frequencies based at least on the error signal.

7. The resonant power converter of claim 6, wherein:
    the frequency control circuit is configured to force the operating frequency to equal the maximum operating frequency during a short circuit situation of the load.

8. The resonant power converter of claim 2, wherein the frequency control power supply circuit includes at least:
    first and second capacitors coupled in series across the resonant capacitor, wherein the first and second capacitors act as a voltage divider to generate the frequency control power signal.

9. The resonant power converter of claim 2, wherein the frequency control circuit includes:
    an optocoupler having an input stage and an output stage, the input stage coupled to receive the error signal, the output stage having a variable impedance between a first output terminal and a second output terminal responsive to at least one of the error signal or the frequency control power signal; and
    the frequency control power signal is coupled to the first output terminal.

10. The resonant power converter of claim 9, wherein:
the input stage of the optocoupler is coupled to a secondary circuit ground reference through a switch; and
the switch is configured to protect the resonant power converter from a short circuit situation by forcing the controller to operate at a maximum operating frequency.

11. The resonant power converter of claim 10, wherein:
a gate of the switch is coupled to the output voltage.

12. The resonant power converter of claim 1, wherein:
the frequency control circuit is configured to dynamically increase the minimum operating frequency to decrease the maximum output current during the overload situation.

13. The resonant power converter of claim 1, wherein:
the frequency control circuit is configured to increase the minimum operating frequency when the output voltage decreases during the overload situation.

14. A method of controlling an output current of a resonant power converter having a substantially constant output voltage, the method comprising:
sensing a voltage signal across a resonant capacitor of the resonant power converter, the voltage signal proportional to an output voltage of the resonant power converter;
sensing a drop in the output voltage associated with an overload situation;
dynamically controlling an operating frequency of the resonant power converter based at least on the sensed voltage signal across the resonant capacitor; and
increasing a minimum operating frequency of the resonant power converter in response to a reduction in the sensed voltage signal across the resonant capacitor.

15. The method of claim 14, further comprising:
controlling an output current of the resonant power converter based on the operating frequency.

16. The method of claim 14, further comprising:
sensing a short circuit situation of the resonant power converter.

17. The method of claim 16, further comprising:
operating the resonant power converter at a maximum operating frequency in the short circuit situation.

18. An LED driver comprising:
a DC-DC converter comprising a plurality of switching elements configured to produce an output voltage across first and second output terminals and an output current through an LED load coupled thereto, based on a DC input and an operating frequency;
a voltage sensor coupled across the first and second output terminals;
means for regulating the operating frequency based at least on output signals from the voltage sensor, relative to a reference value;
means for setting a minimum frequency limit of the operating frequency during normal operating conditions of an LED load, the minimum frequency limit being greater than a resonant frequency of the DC-DC converter, wherein a maximum of the output current is limited by the minimum frequency value; and
means for setting dynamically the minimum frequency limit of the operating frequency during overload conditions of the LED load, wherein in response to a drop in the output voltage the minimum frequency limit is increased to decrease the maximum of the output current.

* * * * *